July 17, 1956   W. J. O'BRIEN, JR   2,754,596
TELEMETRIC FLUID LEVEL INDICATING SYSTEM
Filed Oct. 15, 1951   3 Sheets-Sheet 1

William J. O'Brien, Jr.
INVENTOR.

July 17, 1956   W. J. O'BRIEN, JR   2,754,596
TELEMETRIC FLUID LEVEL INDICATING SYSTEM
Filed Oct. 15, 1951   3 Sheets-Sheet 2

William J. O'Brien, Jr.
INVENTOR.

BY
Attorneys

July 17, 1956 W. J. O'BRIEN, JR 2,754,596
TELEMETRIC FLUID LEVEL INDICATING SYSTEM
Filed Oct. 15, 1951 3 Sheets-Sheet 3
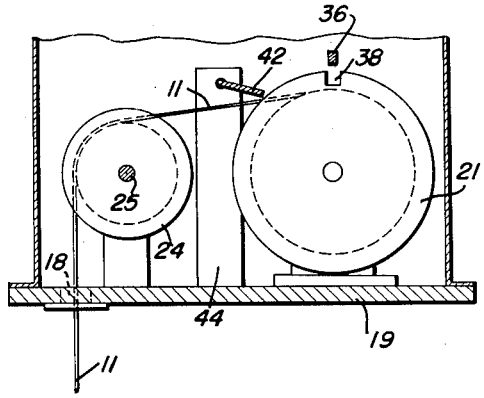
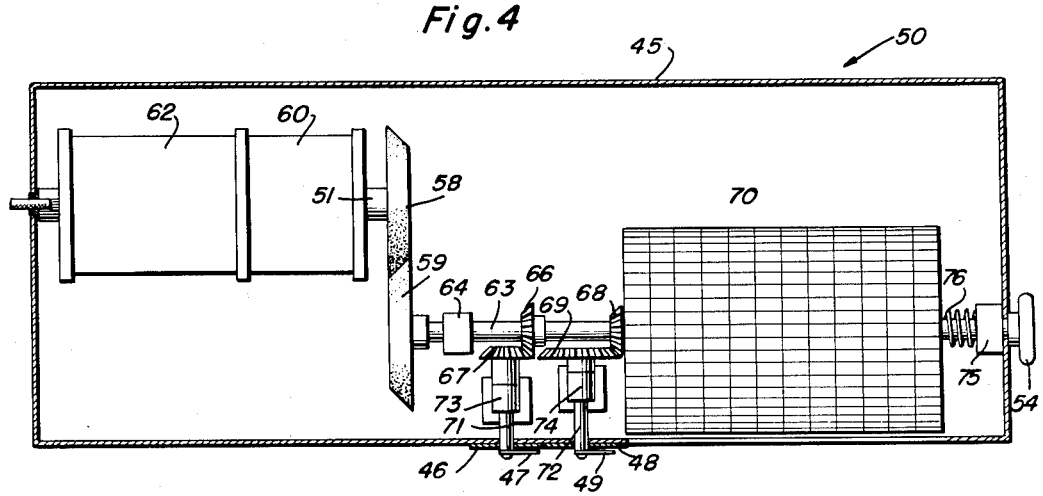
William J. O'Brien, Jr.
INVENTOR.

United States Patent Office 2,754,596
Patented July 17, 1956

2,754,596

TELEMETRIC FLUID LEVEL INDICATING SYSTEM

William J. O'Brien, Jr., Durham, N. C.

Application October 15, 1951, Serial No. 251,401

9 Claims. (Cl. 33—126.6)

This invention relates to a telemetric fluid level indicating system to be used in connection with fluid tanks or other fluid containers and it has for its principal object to indicate, by means of telemetric transmission, at a distance from the tank, the fluid level, the volume of the liquid filling the tank and/or the volume of the tank which is available for filling with the existing fluid level.

Two different types of float operated fluid level indicator systems are generally used. In one type of float operated indicating system the indicator is permanently mechanically or electrically connected with the float which, in its turn, is permanently immersed in the liquid of the tank so that its position currently indicates the position of the fluid level. With another type of fluid level indicating system the float is normally in a position of rest and is only lowered to the fluid level when it is desired to indicate the position of the fluid level within the tank or to make a measurement. The systems of this last named type either use the usual method of operating the indicator which is based on the position of the float or they may use the method of operating the indicator by the movement of the float produced when the latter is lowered from its position of rest to its operative position.

The present invention relates primarily, but not exclusively, to the last named type of tank level indicating systems.

It will be clear that a telemetric indication of the fluid level in a tank using the last named system has its disadvantages, as a manipulation of the float is necessary in order to lower the float into its operative position, a manipulation which may be only performed near the tank the level of which has to be gauged. This fact detracts somewhat from the usefulness of a telemetric indication. Moreover, with a large number of tanks to be serviced, the manipulation which is necessary to lower the float which may be simple in itself is very time consuming; as with a large number of tanks, each tank manipulation entails the lowering, the measurement, and the returning of the float.

Moreover, the indications usually provided permit only to gauge the position of the fluid level in the tank. They leave it to the operator to determine the quantity or volume of the fluid contained in the tank or to determine how much liquid the tank will additionally hold with the indicated fluid level.

The invention provides primarily a system of gauging the fluid level and of measuring the volume or quantity of liquid stored in the tank or, alternatively, of indicating the volume of the space which is still available with the existing fluid level in the tank. Further, the invention provides a system which is entirely operable by remote control from the receiver end and which is so constructed that a single receiver at a central or remote station may be connected selectively with any tank of a number of tanks for the purpose of determining the fluid level, the volume of the fluid filled into the tanks or the volume still available in the tanks.

According to the invention each tank is provided with a float gauge including a float which is normally in a position of rest and which is locked in this position, but which may be released by electro-magnetic means which are impulse operated. When released by impulses sent from a remote station the float operates a movable element, such as a drum, the angular movement of which may be exactly reproduced at the receiving end, preferably by means of Selsyn motors, one of which is driven by the movable element of the transmitter station while the other motor, arranged in the receiving station, reproduces exactly the angular movement of the first named motor and drives the indicating means of the receiver. By providing the transmitter with a calibrated drum winding the leader or cable on which the float is suspended and by providing a braking mechanism preventing backlash a very accurate indication of the fluid level or of the stored fluid volume may be obtained.

According to the invention moreover the receiver comprises not only a counting mechanism or indicator for indicating the footage of the payed out lead or cable, but is also provided with a volume indicating drum to be used in connection with the footage indicator which gives a precise indication of the volume of the fluid corresponding to the movement of the float from its position of rest into its operative position or conversely, which may indicate the volume of the empty space which the float had to traverse in order to reach the fluid level.

Further, according to the invention, the return of the float to its position of rest may be obtained by using the correspondence between the angular movements of the Selsyn motors and by operating the electric motor in the receiver by hand, so that it acts as a generator, the electric motor in the transmitter will turn the drum on which the float is suspended and will therefore wind the cable or leader, thus bringing the float back to its normal position of rest.

In this way it is possible to service any number of tanks of a plant from a single point by connecting the single receiver used at the control station with switching means capable of alternatively and selectively connecting said receiver with any one of the float operated tank transmitters which are to be supervised from the central station, all the operations which are necessary for the gauging operation or for the indication of the fluid level or of the volume in the tank being performed in the receiving station in which also, by means of the aforesaid switch, the desired tank to be supervised may be selected.

More specific objects of the invention will be apparent from the following specification.

The invention is illustrated in the accompanying drawing showing one embodiment thereof. It is however to be understood that the embodiment of the invention which is illustrated in the drawing is shown only by way of example and that no survey of possible further embodiments of the invention is made in the specification. It will however be clear that the example shown has been mainly provided in order to explain the principle of the invention and the best mode of applying the principle. The invention can be carried into effect also by embodiments which differ from that which has been illustrated and a departure from the example illustrated is therefore not necessarily a departure from the principle of the invention.

Figure 1:
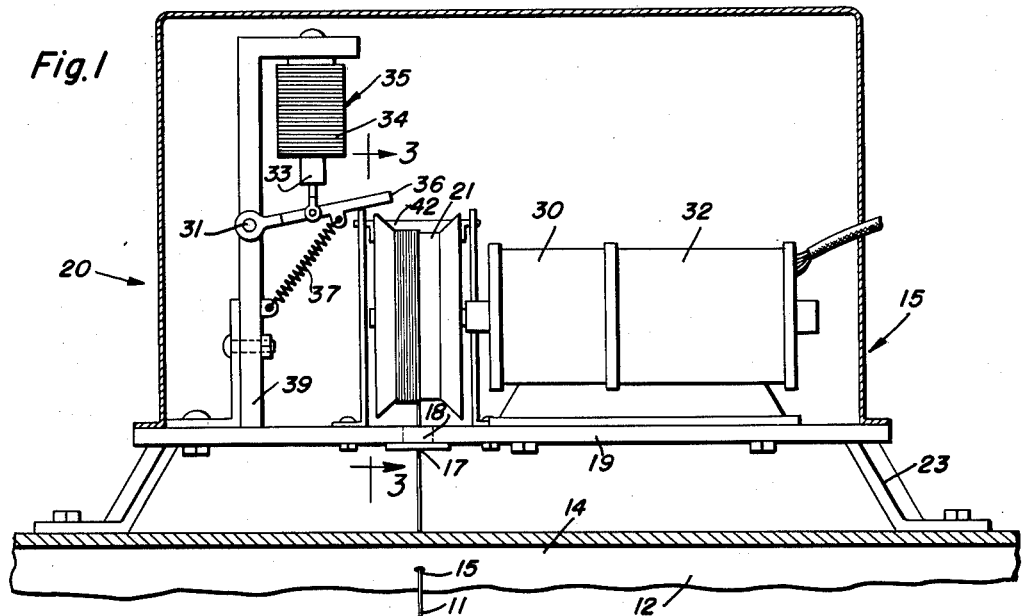
Figure 1 is an elevational sectional view of the transmitter.
Figure 6:
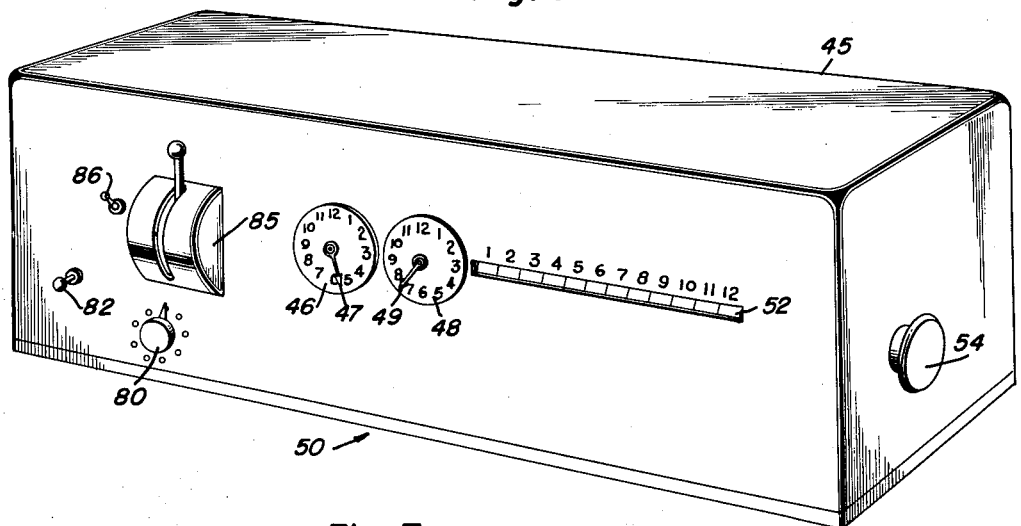
Figure 7:
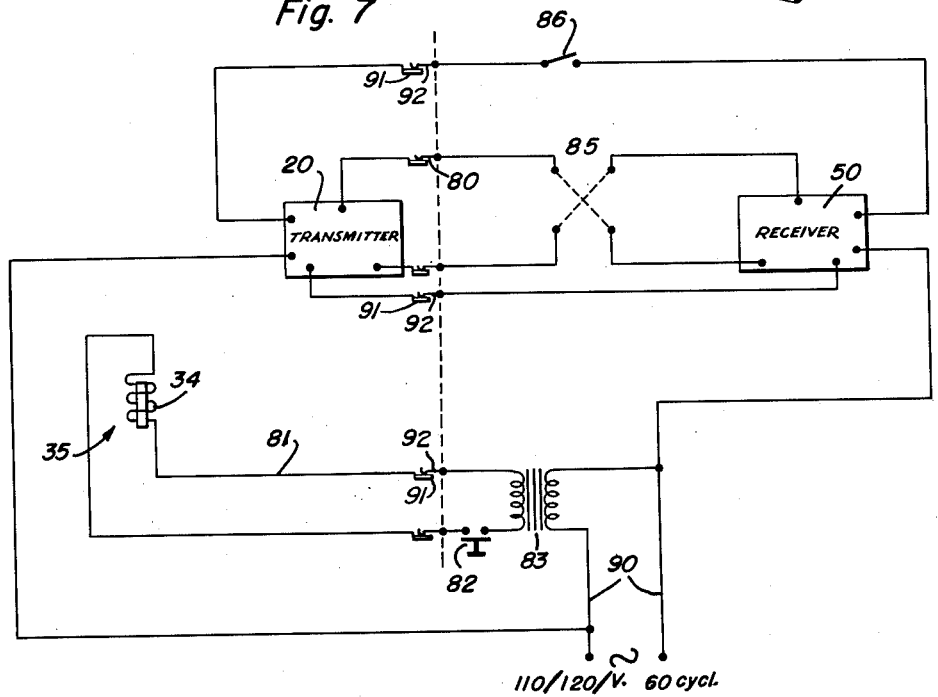

Figure 3 is a sectional elevational side view of the transmitter, the section being taken along the line 3—3 of Figure 1, Figure 4 is a partly sectional plan view of the receiver, Figure 5 is a partly sectional elevational view of the receiver, Figure 6 is a perspective view of the receiver, and Figure 7 is a diagram of the connections between the transmitter and the receiver of the indicating system.

As above stated, the invention relates mainly, although not exclusively, to that type of fluid level gauges in which the fluid level is determined by means of a float which is usually at rest and is in an inoperative position and which is brought into an operative position only for the purpose of determining the fluid level and at the time when the gauging of the fluid level takes place.

The float which is therefore held in a position of rest has to be released in order to perform the measurement and preferably it is the movement of the float from the position of rest to the position of floating on the liquid which produces the indication of the level or the indication of the volume occupied by the fluid in the tank.

In the example illustrated a fluid level indication is obtained by means of a float 10 suspended by means of a leader 11 within a tank indicated at 12. The float is shown in its position of rest near the top of the tank. The leader cable 11 passes through a small opening 15 which may be sealed by a grease seal (not shown) so as to avoid the escape of vapors from the tank.

The indicating device according to the invention comprises a transmitting device generally indicated at 20 and located near and above the tank 12 and the receiver generally indicated at 50 (Figures 4 to 7) and located at any spot which may have been selected either near the tank or at a distance therefrom. The movement of the receiver is electrically controlled by the transmitter, but, as will be explained, the operation of the transmitter is essentially controlled by control means provided in the receiver.

The transmitter unit 20 is preferably encased within a weather-proofed and vapor-proofed casing 15 and, if the tank is not absolutely vapor proof a vapor proof oil or grease seal is used near all openings in the casing and especially near the opening 17 through which the leader cable 11 of the float 10 passes as this opening faces the tank and is in proximity thereto. The baseboard 19 of the casing 15 has therefore to be provided with a suitable well 18 for the seal which must also be so selected that the leader cable, as will appear below, is free to move in a vertical plane to a certain extent. Within the casing 15 which may be mounted on the tank as shown in Figure 1 by means of suitable brackets or supports 23, a drum 21 is mounted on which the end of the leader cable 11 is fastened and on which the said cable is wound. Preferably the drum 21 is calibrated and its peripheric length is a linear function of the length unit used for the measurements. The length of the leader cable which is payed out by the drum can then be expressed directly in suitable units by the number of revolutions made by the drum 21.

The cable passing through the opening 17, before reaching the drum 21, passes over a pulley 24 (Figure 2) and between the pulley and the drum or, as shown, in association with the pulley a device is arranged for guiding the leader cable accurately on the drum so that a single layer is formed, thus securing absolute proportionality between the number of revolutions of the drum and the length of the cable payed out.

Figure 2:
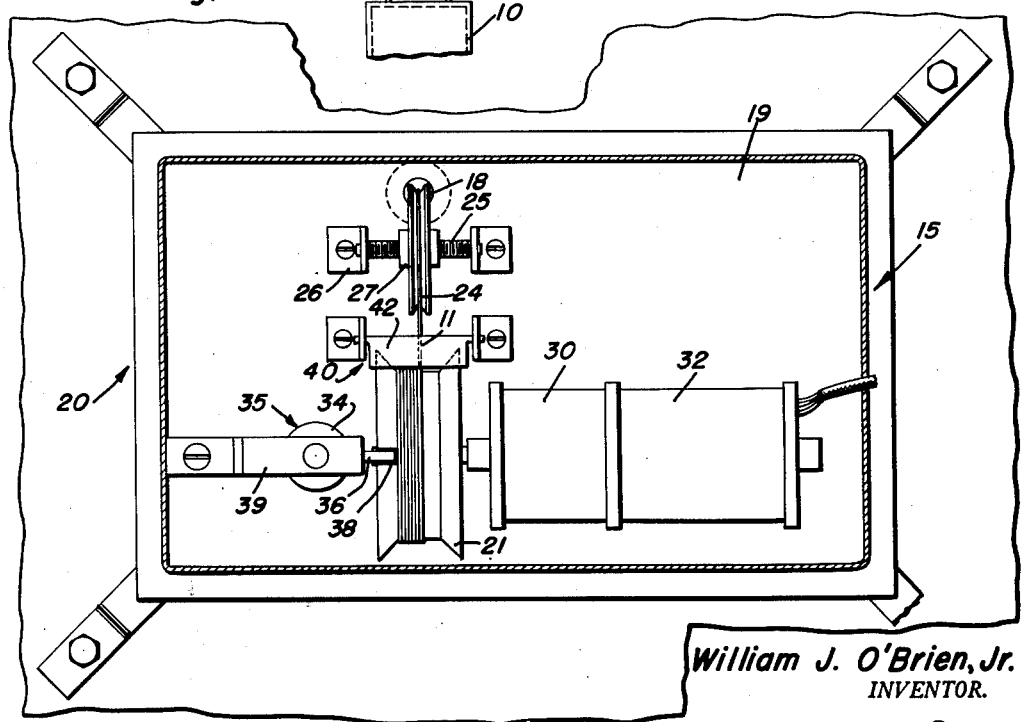
Figure 2 is a partly sectional plan view of the transmitter.

Figure 2 shows, by way of example, a screw-threaded shaft or axle 25 held between supports 26 which carries the pulley, the latter being provided with a hub member 27 which is provided with internal screw-threads so that during rotation of the pulley produced by the leader cable 11 running over it, an axial shifting of the pulley occurs to such an extent that successive turns on the drum will be spaced closely to each other but will avoid overlaying of windings or an irregular spacing.

The drum 21 is driven by a Selsyn motor 30 and transformer 32 which motor, as well known, is capable of absolute synchronism with a similar motor on the same network so that every angular motion of the Selsyn motor is reproduced by every other Selsyn motor which may be connected with the said network. As the Selsyn motors and their connections are well known it does not seem necessary to describe them. The cooperation between the Selsyn motors in the present case is described below.

The drum 21 is provided with an electro-magnetic braking and locking device 35 indicated semi-diagrammatically in the figures which consists essentially of a solenoid 34 provided with a core or armature 33 which is pivoted to a brake and lock arm 36. The arm is pivoted to a post 39 carrying the solenoid at 31. The lock and brake arm 36 is under the tension of spring 37 which pulls the lock and brake arm 36 downwardly when the solenoid is de-energized so that the said arm is pressed against the flange of the drum 21 or against a disk mounted on the drum. The said flange or disk mounted on the drum is provided with a notch or indentation 38 which is engaged by the lock and brake arm 36 when pulled downwardly by spring 37 so that the drum 21 is held in a fixed position against rotation as long as the solenoid is de-energized. The measurement which leads to the fluid level indication therefore starts always from the same position of the drum which is determined by the notch 38.

The electro-magnet or solenoid is operated by means of a special circuit 81 in a manner described below.

In addition, an anti-backlash mechanism 40 is arranged to provide the drum from overrunning the proper position in which it should stop when the float reaches the surface of the fluid in the tank, by virtue of the speed which the drum may have acquired during the lowering of the float to the liquid level. This mechanism is diagrammatically shown in Figure 3. It consists of a blade 42 applied against and resting on the leader cable 11 of the float which is applied against the flanges of the drum 21 or against disks fixed to said flanges which act as a braking means when the leader cable begins to slacken. As long as the leader cable is taut the blade is held in lifted position in which it is out of contact with the rims of the flanges of the drum, but as soon as a slackening of the leader cable occurs the blade 42 is applied against said flanges and effectively brakes and stops a further movement of the drum 21.

It will therefore be clear that upon energization of the solenoid 35 lifting the brake and lock arm 36 out of the notch the float 10, under the action of gravity, will drop entraining the leader cable 11 until it reaches the fluid level where the float comes to rest. As soon as the movement of the float ceases or is materially slowed by the impact, the leader cable slackens and the blade 42 is applied against the flanges of the drum and stops any further movement of the same. The flanges or special disks attached to the sides of the drum may be roughened or lined with suitable material to produce sufficient friction.

The receiver, generally indicated at 50, may be located at any convenient point as its connection with the transmitter is established merely through an electric network. The general appearance of the receiver is shown in Figure 6, from which figure it may be seen that the receiver is housed in a completely closed box 45 which is portable and which carries and displays the indicator dials 46 and 48 with their pointers 47 and 49 moving in front of them. Moreover the casing is provided with a slot 52 through which the indication for the volume of the liquid stored in the tank or for the volume which is still available within the tank is displayed.

The box 45 moreover carries a number of switches 80, 82, 86 and 85 and at the end of the box a knob 54 projects. The function of the switches and the function of the knob 54 will be explained below.

Essentially the receiver comprises the Selsyn motor 60 and a Selsyn transformer 62 mounted on the baseboard 55 of the receiver (Figure 5), the motor 60 driving a friction wheel 58 which is in frictional engagement with another friction wheel 59. The friction wheels may preferably be conical wheels and the ratio of the transmission between the wheels is suitably selected. In the example a 1:1 transmission ratio is shown.

The frictional pressure between the friction wheels may be produced by a compression spring 76 acting on the shaft 63 carrying the friction wheel 59.

The axially displaceable shaft 63 carrying the friction wheel 59 is journaled in bearings supported on posts 64 and 75. The shaft 63, in addition, carries two bevel gear wheels 66, 68 which mesh with engaging bevel gear wheels 67, 69 respectively which are mounted on shafts 71, 72 journaled in suitable bearings held on posts 73, 74. The two shafts 71, 72 carry the pointers 47, 49, moving in front of the dials 46, 48. It will be noted that the friction wheels and the gear wheels 59, 66, 68 are all located on the same side of the friction and gear wheels with which they cooperate so that the shaft 63 may be moved in axial direction, thus disengaging the friction wheels and gear wheels of the cooperating pairs.

The shaft further supports the indicator drum 70 the cylindrical periphery of which carries the volume indications. For this purpose the indicator drum surface is divided axially and at right angles thereto into a number of fields, a series of fields being always displayed through the slot 52 of the casing. Each of said fields carries a volumetric indication as is explained below.

The shaft is supported at its end by a bearing held in the support 75 and projects outwardly through the casing and carries at its end a knob 54. Between the drum which is fixed on the shaft 63 and movable with the shaft and between the fixed member 75, the spring 76, above mentioned is inserted. Obviously, if the knob is pulled in an axial direction the spring is compressed and the shaft 63 is moved towards the right in Figures 4 and 5. The friction wheel 59 and the two bevel gear wheels 66 and 68 are then disengaged from the friction wheel 58 and from the bevel gear wheels 67 and 69, respectively, with which they usually mesh and the shaft 63 may then be freely rotated and the drum may be adjusted independently without moving the rotor of the Selsyn motor or the shafts carrying the pointers.

The indications on the drum and on the dials are preferably based on the system of units which is used. For instance, if feet and inches are used to indicate the liquid level in the tank and gallons to indicate the volume of liquid, the indications are best so selected that a diameter of the drum, the gear ratios for the friction wheels and gear wheels etc. all correspond to units in the desired system or a multiple thereof and are all based on a duodecimal system.

The length of the leader cable 11 must be so chosen that the float may travel from a point of maximum capacity of the tank (near the top), to a liquid level of minimum capacity (near the bottom). With this construction a linear movement of the leader cable 11 of the float 10 which moves the transmitter will impart an angular movement to the transmitter drum 21 which is constant whatever the length of the leader cable payed out; the movements performed by the float will therefore be equal for all equal distances of travel of the float, whether the float is in its upper or in its lower or any middle position. The drum is preferably so dimensioned that its diameter is $12n/\pi$ inches, the letter $n$ varying with the dimensions and being preferably an integer. Therefore a linear movement of the float through say 1 foot at any place causes an angular movement of the drum through an angle of $360/n°$. If $n=1$, for instance, the movement of the float through 1 foot produces one revolution of the drum. The ratio between the friction wheels is preferably 1:1 and as the angular movement of the two Selsyn motors is equal this means that for one revolution of the drum in the transmitter the shaft 63 in the receiver also performs one revolution. One of the pointers, for instance pointer 47, is driven with a 1:1 gear ratio from the shaft while the other pointer for instance 49 is driven at a 1:12 gear ratio in the example given. Therefore one of the pointers will indicate 12 feet of motion of the float and the pointer describes a full circle on the dial, while the other pointer will perform a full circular motion on the dial for a motion of only 1 foot and will therefore indicate the inches or $\frac{1}{12}$ fractions of the unit selected.

The periphery of the cylinder used for volume indication is divided into a number of angular sections which are a multiple of 12 in the system above described; for instance, the periphery may be divided into 48 parts. One line which is drawn to one of these subdivisions is marked as the zero line. The other lines which are all generatrices of the cylinder delineate the fields on which the volumetric indications are entered. The cylinder as above stated is moreover divided axially by lines corresponding to the intersection of equidistant planes with the cylinder at right angles to the cylinder axis. The network of lines consisting of the two above described systems therefore defines a number of enclosed indicator spaces each of which carries a figure corresponding to a volumetric indication. There will be as many axial subdivisions on the cylinder as there are angular subdivisions on the dial 46 and therefore the indication which is to be read by the observer in a special case is that indicated by the pointer on the dial. The figures along one of the lines which are parallel to the axis of the cylinder will appear in the slot 52 and these figures correspond to the volume stored in the tank at this position of the float or they may correspond to the capacity of the tank which is available when the level of the liquid occupies the position indicated by the pointers.

If the starting or zero line marked on the cylinder is so set that it corresponds to the starting or zero point of the pointer 47 the figure to be selected among the 12 figures displayed in the slot 52 will be indicated by the pointer indicating the number of feet through which the float has traveled, each column between the lines which run around the cylinder showing figures which differ from the adjacent column by the amount corresponding to 1 foot of difference in the liquid level.

It will also be clear by inspection of Figure 6 that the positions of the pointer indicate the exact position of the liquid level in the tank in feet and inches and above the minimum level (or below the maximum level) and that when reading the figures under the heading corresponding to pointer position of the first pointer on the drum the volume of stored liquid can immediately be read.

The electrical connections and the operation of the Selsyn motors 30, 60 are well known in the art and need therefore not be explained. The principle consists in having both motors connected in identical manner with the same network indicated at 90 in Figure 7. The motors, as well known, are self-synchronizing induction motors and the angular movement of each rotor to which an external force is applied so changes the magnetic field of the motor as to affect the other motor so that the latter will perform an angular movement to the same extent. Therefore, any angular movement of the drum 21 of the transmitter caused by the float produces an angular movement of the same extent in the motor 60 which is transmitted to the shaft 57 and thereby to the friction wheel 58, and to the shaft 63, thus causing corresponding movements of the pointers.

In order to produce the alignment of the zero line of the drum 70 with the pointer 47 the knob 54 is pulled outwardly and the necessary adjustment is made whereupon the knob is again released, the compression spring producing again a meshing of the gear wheels and a frictional pressure between the friction wheels.

It will be clear that a single receiver can be used in connection with any number of tanks and of transmitters. As indicated in Figure 7 a selector switch 80 may be inserted between the transmitter and the receiver. This switch has a number of contacts 91 to which its arms may be moved. The receiver may therefore be connected selectively with any tank to be measured by moving the arm to the contacts corresponding to the tank.

Each transmitter is moreover provided with a special circuit 81 for the solenoid 35 the winding 34 of which is energized by means of a transformer 83 connected with the network. The connection in the receiver is provided with a switch 82 which may be a push button or a tumbler switch and which is preferably carried by the front wall of the receiver. The operator by pressing the push button switch 82 may therefore operate the solenoid in the transmitter with which the receiver has to be connected.

The receiver which represents the indicator proper is very small and simple and can therefore be made portable and may be carried by the person inspecting tanks and can also be used in this way that the operator inspecting the tanks plugs in the cable connected with the receiver to an outlet connected with the transmitter in order to determine the height of the fluid level or the quantity stored in the tank or the capacity of the tank which is still available. In both cases which are above mentioned, a single receiver is necessary which is either operated and supervised from a remote control station or which is carried along by the operator inspecting the tanks.

A double pole double throw reversing switch 85 is preferably inserted between the transmitter and the receiver in order to be able to use the receiver with a predetermined direction of rotation regardless of the direction of rotation of the transmitter.

For operating the indicator and to determine the height of the liquid level in any tank the operator proceeds by turning the switch 80 to the contacts which lead to the transmitter of the tank to be inspected. He then turns the knob 54 so that the footage indications indicates the maximum height of the fluid level while the other indicator, for instance 47, 49, must be at zero. The drum 70 must also be set for maximum tank volume. Further, the reversing switch 85 must be so set that the pointers 47, 49 move counter-clockwise when the float moves downwardly.

The knob 54 is now pulled out and the switch 86 is closed. The knob may then be released. The apparatus is now ready for the indication. The operating push button 82 and the locking solenoid 34 of the transmitter is operated. The solenoid magnet moves the locking lever arm out of engagement with the notch 38 thus releasing the drum and the float will therefore drop by the influence of gravity until it comes to rest on the liquid level of the tank. During this movement the pointer 47 indicates a number of feet through which the float travels and at the end when the float comes to rest the two pointers indicate the number of feet and the number of inches corresponding to the height of liquid within the tank. The depth of the liquid in the tank having been determined the operator may now read the number of gallons by taking the figure in the column the number of which corresponds to the figure indicated by the pointer 47. For instance, if pointer 47 marks 5 the figure in the column which is marked 5 gives the number of gallons in the tank. In order to find this figure without difficulty the casing may be marked accordingly above the slot and carries the figures which correspond to the columns inscribed on the drum.

In order to bring the float back to its position of rest the operator rotates the knob 54 by hand in a direction which is opposed to the direction of rotation of the drum during the preceding descent of the float. The turning of the knob 54 rotates the motor 60 which acts as a generator and therefore drives motor 20 which rotates the drum 21 of the transmitter. The push button switch or tumbler switch 82 must be kept depressed or must remain in its energized position and is only released when the pointer 47 indicates that the float is again in its position of rest. The release of switch 82 then locks the drum 21 and the float in this position.

To determine the volume within the tank which is still available or which is required to fill the tank the pointers must again be set to zero, but the reversing switch 85 must be thrown in order to reverse the connections. The indicators now rotate clockwise and when the float comes to rest on the fluid level of the tank they will indicate the difference between the maximum height of the fluid in the tank and the actual fluid level and thereby the volume of the empty space above the liquid in the tank.

It has already been mentioned that the four switches 80, 82, 86 and 85 are preferably all located on the panel of the receiver box 45 so that the latter forms a self-contained unit which need only be connected with a network by means of a plug-in cable (not shown) to make the receiver operative.

The apparatus is clearly usable for any fluid including viscous fluids. Moreover there is no difference between tanks on the ground or underground tanks the latter being usually very difficult to supervise from a center. The indicator furnishes not only the height of the level but as above explained also all indications relative to the volume filled by the fluid and to the volume which is still available with a simple manipulation. The indicator thus is a very simple instrument of great utility on account of the complete information it furnishes and also on account of the easy manipulation to obtain a remote indication, on account of its practically unlimited range of operation and also on account of its high accuracy.

It will be understood that changes of an unessential nature may be made in the construction which has been illustrated without in any way departing from the scope or essence of the invention as defined in the annexed claims.

Having described the invention, what is claimed as new is:

1. In a system for indicating the fluid level, the volume of the fluid and the volume available above the fluid within a tank, a transmitter unit comprising a float acting as a weight suspended above the fluid level within the tank in a predetermined position on a leader cable attached to said float, a calibrated drum to which said cable is attached, a Selsyn motor directly connected for rotation with said drum, a locking and a braking means connected with said drum, said locking means locking the said drum in a definite position of rest thus determining the initial position of the float, and said braking means acting on and braking and arresting said drum when the float under the action of gravity reaches the fluid level, and ceases to act as a weighting and tensioning means for the cable, means controlled by the leader cable tensioned by the float for operating said braking means, producing a braking action upon slackening of the cable tension when the descending float hits the fluid level and is supported thereby, electromagnetic means for releasing said locking means of the drum, an A. C. network, a second Selsyn motor connected by means of the network to the Selsyn motor driven by the drum, an indicator shaft driven by said second Selsyn motor in a receiver and indicator unit, including a counter means for indicating the extent of rotational movement imparted to the indicator shaft, and a separate circuit for operating the aforesaid electromagnetic releasing means of the drum, arranged in said receiving and indicating unit.

2. An indicator system with a transmitter as claimed in claim 1 wherein the drum is provided with marginal flanges and the leader cable controlled means comprise a pivoted blade resting on the leader cable in front of the drum, said blade being arranged transversely above the drum so as to drop on the flanges of the drum under the action of gravity when not held by the leader cable to prevent movement of the drum after the stopping of the float.

3. An indicating system with a transmitter as claimed in claim 1 wherein the locking means of said drum includes a notched disk connected with said drum, and a spring pressed lever adapted to engage the notched portion of the disk and wherein the electromagnetic means for releasing and locking the drum includes a solenoid provided with a movable core connected with said locking lever and lifting the same so as to disengage the locking lever from the notched disk upon energization, the disk being locked in a predetermined position by engagement of the spring pressed lever upon de-energization of the solenoid.

4. In a system for indicating the fluid level of a tank, the volume, the fluid within the tank and the volume available above the fluid level respectively, a float operating a calibrated drum connected with a transmitter Selsyn motor, a network supplying alternating currents to said Selsyn motor and a receiver comprising a receiving Selsyn motor, connected with the aforesaid network, an indicator shaft disengageably connected with said motor, revolution indicating pointers driven by said indicator shaft, and a volume indicator drum driven by said shaft, said drum being provided with a number of volume indications arranged in axially spaced circumferential zones, frictional driving means between the receiving Selsyn motor and the indicating shaft, disengageable upon axial movement of the same, a spring pressing the shaft in one direction to produce engagement of the frictional driving means and a knob on said shaft for manually producing an axial movement of the indicator shaft.

5. A system for selectively indicating the fluid level, the volume filled by a fluid and the volume available within each of a plurality of tanks at a central point, comprising a float within each of said tanks, suspended above the fluid level in a predetermined position of rest on a cable, and acting as a weight pulling the cable downwardly by gravitation, until the float reaches the fluid level, a calibrated drum for each of said tanks on which each cable is wound and fixed for driving the drum during unwinding when the float acting as a weight moves downwardly by gravitation, means for arresting and locking said drum to keep it and the float in a predetermined initial position, a Selsyn motor directly coupled with and driven by said drum, said float, calibrated drum, arresting means and Selsyn motor forming a transmitter unit, a network supplying alternating currents, connections of this network with the Selsyn motors in each of said transmitter units, electromagnetic unlocking means for operating and releasing the locking means of said drum, including an electromagnet and an energizing circuit for the same in each transmitter unit, a receiving and indicating station at a central point, said receiving and indicating station being provided with a Selsyn motor connected with the aforesaid network and operable by each of said Selsyn motors connected with one of the drums, a selective manually operated multi-contact switch in each receiving and indicating unit for connecting the same with any one of a plurality of transmitter units, said switch controlling simultaneously both the connections leading from the Selsyn motor connected with the drum of each transmitter unit to the Selsyn motor of the receiving and indicating station, and connecting the energizing circuit of the electromagnetic control means with said station, an indicator shaft in the receiving and indicating station driven by the Selsyn motor of the receiving and indicating station, means for controlling the aforesaid electromagnetic unlocking means of the drum arresting and locking means arranged in the receiving and indicating station, and means for indicating the extent of the rotational movement performed by the calibrated drum after release connected with said indicator shaft.

6. In an indicating system as claimed in claim 5 wherein a reversing switch is provided on the receiver in the connection between the transmitter and the receiver Selsyn motor to change the direction of movement of the Selsyn motor in the receiver and wherein the drum is provided with volume indications indicating the entire volume between the position of rest and the bottom of the tank so that upon reversal of the rotation of the drum the latter indicates after reversal of the switch position, the volume of the fluid in the unfilled volume of the tank.

7. A system for indicating the fluid level, the volume filled by a fluid, and the volume available above the fluid in a tank, comprising a float suspended on a cable in a predetermined position of rest above the fluid level and forming a weight pulling said cable downwardly, a calibrated drum on which said cable is wound and fixed, the weight forming float, when moving from its position of rest under gravitational pull, unwinding the cable and rotating the drum, electromagnetic means for retaining said drum and float in a predetermined initial position of rest with the cable wound on the drum, said means including locking means for the drum, electromagnetic means for releasing said locking means, thus freeing the float forming the weight for a descent under the action of gravity towards the fluid level, such descent unwinding the cable and rotating the drum, means for arresting the drum when the float reaches the fluid level, a Selsyn motor directly coupled with the drum and moved with the drum, an A. C. network, a second Selsyn motor connected with the aforesaid network and with the Selsyn motor driven by the drum, an indicator shaft driven by said Selsyn motor of the receiver and indicator unit, a counter means for indicating the extent of rotational movement imparted to the indicator shaft, and a separate circuit for operating the aforesaid electromagnetic releasing means of the drum, arranged in said receiving and indicating unit.

8. In a system for indicating the fluid level, the volume of the fluid, and the volume available above the fluid level within a tank, respectively, a float suspended on a cable, said cable being attached to a calibrated drum, means for holding the drum arrested in a position of rest with the float suspended above the fluid level, means for releasing said holding means of the calibrated drum, said release producing descent of the float to the fluid level and rotation of the drum, the latter being connected with a transmitting Selsyn motor, a network supplying alternating currents to said Selsyn motor, a receiver comprising a receiving Selsyn motor, connected with the aforesaid network, an indicator shaft disengageably connected with said receiving Selsyn motor and rotated by the same, pointers driven by said indicator shaft, and indicating the revolutions made by said shaft, a dial for each pointer provided with a gradation divided into units provided with marks, and a volume indicator drum driven by said shaft, the drum being provided with a number of volume indications arranged in axially spaced circumferential zones, each zone corresponding to one unit of a dial, means for axially moving the indicator shaft and drum and for disengaging the indicator shaft from said receiving Selsyn motor, and means for displaying simultaneously a number of volume indications, the indication valid for the existing pointer reading being indicated by the marked unit, pointed at, on the dial.

9. In an indicating system with a receiver as claimed in claim 8, a housing for said receiver provided with a longitudinal slot, the latter arranged in an axial direction in front of a longitudinal strip of the drum, indicia placed along said slot, a dial in front of the pointer with corresponding indicia, the indicia indicated by the pointer thus indicating the volume indication corresponding to the pointer position.

References Cited in the file of this patent

UNITED STATES PATENTS

| | | |
|---|---|---|
| 329,711 | Briggs | Nov. 3, 1885 |
| 812,269 | Horton | Feb. 13, 1906 |
| 871,124 | Knoblock | Nov. 19, 1907 |
| 1,851,195 | Leilich | Mar. 29, 1932 |
| 2,254,910 | Richards et al. | Sept. 2, 1941 |
| 2,265,736 | Larson | Dec. 9, 1941 |
| 2,282,774 | Wiggins | May 12, 1942 |
| 2,356,762 | Kalix | Aug. 29, 1944 |
| 2,474,267 | Mahnke | June 28, 1949 |
| 2,600,341 | Thompson | June 10, 1952 |